(12) United States Patent
Ducauchuis et al.

(10) Patent No.: US 9,346,253 B2
(45) Date of Patent: May 24, 2016

(54) METHOD FOR IMPARTING ELASTICITY TO A NON-WOVEN MATERIAL / ELASTOMER LAMINATE

(75) Inventors: Jean-Pierre Ducauchuis, Nantes (FR); Thierry Marche, La Chapelle-Basse-Mer (FR)

(73) Assignee: APLIX, Paris (FR)

( * ) Notice: Subject to any disclaimer, the term of this patent is extended or adjusted under 35 U.S.C. 154(b) by 0 days.

(21) Appl. No.: 13/614,644

(22) Filed: Sep. 13, 2012

(65) Prior Publication Data

US 2013/0029554 A1 Jan. 31, 2013

Related U.S. Application Data

(62) Division of application No. 11/788,231, filed on Apr. 19, 2007, now Pat. No. 8,318,071.

(30) Foreign Application Priority Data

Apr. 28, 2006 (FR) ...................... 06 03880

(51) Int. Cl.
| | |
|---|---|
| D04H 13/00 | (2006.01) |
| B32B 37/14 | (2006.01) |
| B29C 55/18 | (2006.01) |
| B32B 37/15 | (2006.01) |
| B32B 38/06 | (2006.01) |
| B32B 38/00 | (2006.01) |

(52) U.S. Cl.
CPC ............... *B32B 37/144* (2013.01); *B29C 55/18* (2013.01); *B32B 37/153* (2013.01); *B32B 38/06* (2013.01); *B32B 2038/0028* (2013.01); *B32B 2309/16* (2013.01); *B32B 2555/02* (2013.01); *Y10T 442/601* (2015.04); *Y10T 442/659* (2015.04); *Y10T 442/679* (2015.04)

(58) Field of Classification Search
CPC .................. B32B 2307/51; B32B 2038/0028; B32B 2309/16; B32B 2555/02; B32B 37/144; B32B 37/183; B32B 38/06; B29C 55/18; Y10T 442/659; Y10T 442/679; Y10T 442/601
USPC ................................... 442/328, 394
See application file for complete search history.

(56) References Cited

U.S. PATENT DOCUMENTS

| | | | | |
|---|---|---|---|---|
| 5,156,793 | A * | 10/1992 | Buell et al. .................. | 264/288.8 |
| 5,422,172 | A * | 6/1995 | Wu ............................. | 442/328 |
| 2003/0114824 | A1* | 6/2003 | Odorzynski et al. ..... | 604/385.25 |
| 2005/0106980 | A1* | 5/2005 | Abed et al. .................... | 442/395 |

* cited by examiner

*Primary Examiner* — Jeremy R Pierce
(74) *Attorney, Agent, or Firm* — Renner, Kenner, Greive, Bobak, Taylor & Weber

(57) ABSTRACT

Method for imparting elasticity to a laminate comprising at least one elastic film having a width and at least one ply of non-woven material secured to the film, particularly through interposition of a bonding material, particularly glue, which comprises the following steps in which:
the laminate is unrolled in the form of a web in order to pass it between two sets of toothing, of which the teeth engage in each other in a direction perpendicular to the plane of the laminate in order to thus stretch the laminate in the direction of its width, characterised in that:
a tension is imparted to the web in the longitudinal direction or machine direction during its unrolling between the toothing, particularly by providing a tensioner roll, particularly downstream of the sets of toothing.

21 Claims, 3 Drawing Sheets

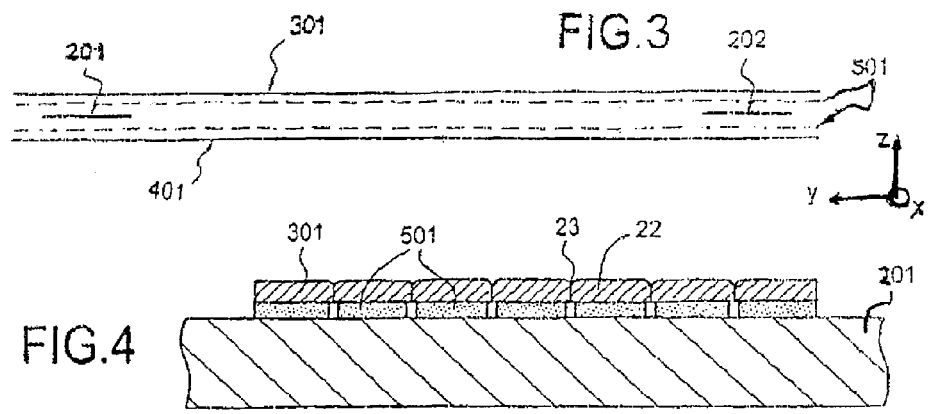
FIG.3
FIG.4
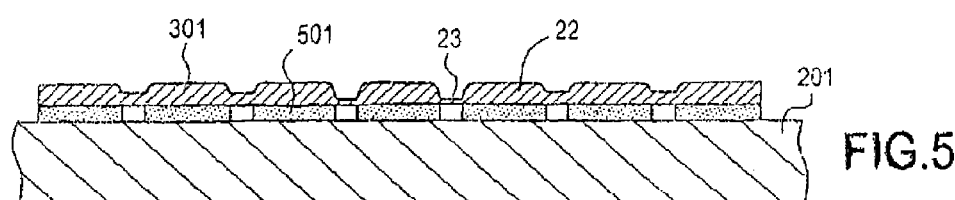
FIG.5
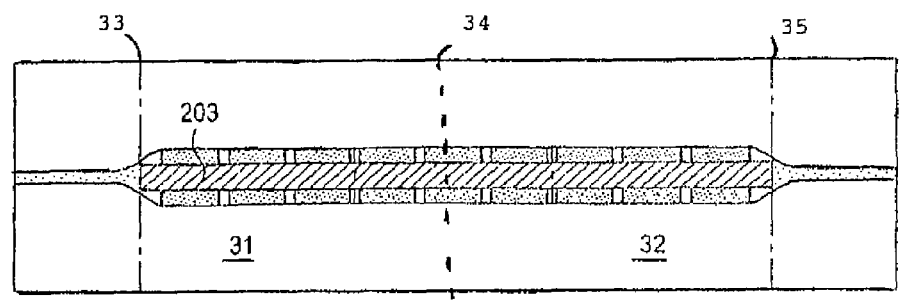
FIG.6
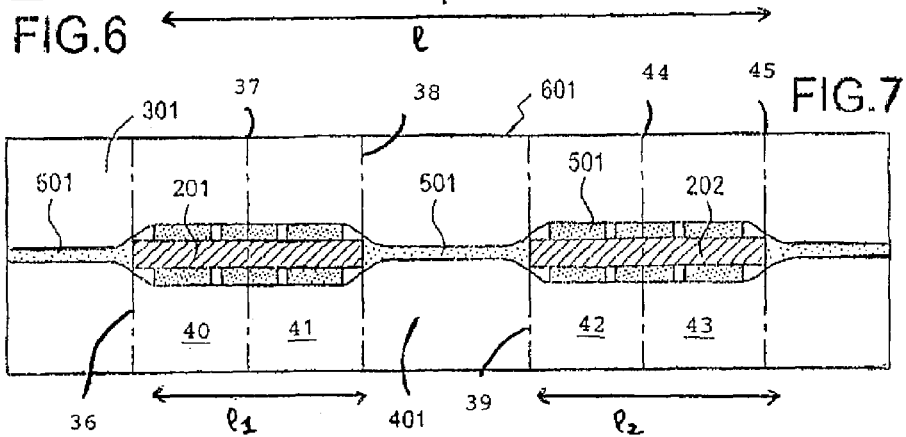
FIG.7

METHOD FOR IMPARTING ELASTICITY TO A NON-WOVEN MATERIAL / ELASTOMER LAMINATE

CROSS-REFERENCE TO RELATED APPLICATION

This application is a division of U.S. patent application Ser. No. 11/788,231 which was filed on Apr. 19, 2007, and issued as U.S. Pat. No. 8,318,071 on Nov. 27, 2012.

TECHNICAL FIELD

The present invention relates to a method for imparting elasticity to a laminate comprising at least one elastic film, particularly with an elastomer base, particularly thermoplastic, and at least one ply of non-woven material secured to the elastic film. The present invention also relates to a device for imparting elasticity to a laminate of this type, and also to a laminate of this type.

BACKGROUND ART

A laminate comprising at least one elastic film, particularly with an elastomer base, particularly thermoplastic, and at least one ply of non-woven material secured to the elastic film, is used in particular in applications in the field of clothing, in particular throwaway, such as training pants or devices for adult incontinence, or in the medical field in the form of elastic bandages. In the field of training pants, these laminates are conventionally used in the sections forming the waistband around the waist of the baby. In particular these laminates are used to realise the elastic tabs ensuring that the nappy is kept on the baby and supporting, amongst other things, a hook and loop fastener. In general the securing of the nappy or sheet of non-woven material to the elastic film is realised through the interposition of a bonding material, particularly glue, either continuously between the non-woven material and the elastic or in discrete zones, in particular in points or in lines. The securing of the non-woven material and the elastic film means that it is necessary to impart elasticity to the laminate by stretching it. This is an operation traditionally called "activation" in the field of training pants. In fact, before the laminate has been stretched it does not really have any elasticity or at least in the case of using non-woven fabric having a slight elasticity, it only has a slight elasticity compared to non-woven fabric. After activation, that is to say after the stretching of the laminate in its entirety, the laminate will have, by reason of a sort of breaking or coming-apart or de-cohesion of the fibres of the non-woven fabric, an elasticity which will correspond to that of the elastic film, of which the elastic capacities will thus have been released.

In order to realise this activation, it is known that the laminate can be passed in the form of a web or composite between two toothed rolls, of which the teeth engage in each other. The teeth of the rolls extend essentially perpendicularly to the direction of unrolling of the web (machine direction). The mutual engagement of the teeth while the laminate is between the two sets of toothing brings about the stretching of the laminate. Upon leaving the two rolls, the laminate assumes essentially the form which it had prior to entering the rolls. However, the distortion which takes place means that, now, the laminate as a whole has elasticity, namely a transverse elasticity between its initial width and its final width (in the non-stretched state) and the maximum width which it has when it is between the two toothed rolls. The laminate has thus been activated.

It is already known from the prior art and in particular the U.S. Pat. No. 5,167,897 that an activation of this kind can be realised. The web is unrolled therein with a virtually zero longitudinal tension and the outer peripheral edges of the laminate adjacent to the region to be activated are maintained, for example by depression or belt systems, during the action of the toothed rolls. The device used in its entirety is quite complicated, requiring in particular complex systems for maintaining the outer peripheral edges adjacent to the region of the laminate to be activated. Besides, the laminate obtained by these methods of the prior art presents risks of delamination or becoming unstuck at the outer edge of the laminate between the non-woven material and the elastomer in such a way that it is necessary to provide either glues with a strong sticking power or a solder line, particularly ultrasonic, along these edges.

DISCLOSURE OF THE INVENTION

The present invention aims to overcome the drawbacks of the prior art by proposing a method for imparting elasticity to a laminate of the type mentioned above which, on the one hand, is simpler to implement and in particular does not require the maintaining of the adjacent outer peripheral edges of the section of the laminate to be activated and which, on the other hand, allows a laminate to be obtained, of which the connection between the elastomer and the non-woven material has less tendency to become unstuck at the outer edges in such a way that it may be possible to omit the provision of solder lines along these edges.

According to the invention a method for imparting elasticity to a laminate comprising at least one elastic film having a width and at least one ply of non-woven fabric secured to the film, particularly through the interposition of a bonding material, particularly glue, which comprises the steps in which:

the laminate is unrolled in the form of a web in order to pass it between two sets of toothing, of which the teeth engage in each other in a direction perpendicular to the plane of the laminate in order to thus stretch the laminate in its width, is characterised in that:

a tension is imparted to the web in longitudinal direction or in the machine direction during its unrolling between the toothing, particularly by providing a tensioner roll, particularly downstream of the sets of toothing.

A very simple system is thus obtained according to the invention which, in particular, does not necessitate the provision of complicated means which maintain the outer peripheral edges of the laminate to be activated during its activation and which, however, allows a laminate to be obtained, of which the connection between the elastomer and the non-woven material is more resistant to becoming unstuck, particularly at the outer edges, in such a way that it may be possible to omit an ultrasonic solder line or to provide less costly glues than in the case of the laminates of the prior art.

According to a preferred embodiment of the invention, a tension of at least 1 Newton (N) is applied for 10 mm of width and 100 g/m$^2$ of said width of the laminate to be activated; preferably, the tension is at least 2 N/10 mm/100 g/m$^2$, more preferably at least 2.5, for example between 1.2 and 8, in particular between 2 and 5, for example equal to 2.6.

According to a preferred embodiment of the invention a tension is imparted of at least 0.64 Newton (N) for 10 mm of width and 100 g/m$^2$ of ply of non-woven material; preferably, the tension is at least 0.9 N/10 mm/100 g/m$^2$ of non-woven material, more preferably at least 1.2, for example between 0.65 and 3, in particular between 1 and 2, for example equal to 1.3.

According to a preferred embodiment of the invention the elastomer film is extruded and deposited on the ply of non-woven material in a softened state, whereby the composite is then activated.

The composite thus only has one or two plies of non-woven material and intermediate layers of glue.

The present invention also relates to a device for imparting elasticity to a laminate comprising at least one elastic film having a width and at least one ply of non-woven material secured to the film, particularly through the interposition of a bonding material, particularly glue, whereby the device comprises means for unrolling the laminate in order to pass it between first toothing and between second toothing, of which the teeth engage mutually in each other in a direction essentially perpendicular to the unrolling plane of the web, characterised in that means are provided for imparting a longitudinal tension to the unrolled laminate.

According to a preferred embodiment of the invention, the means for imparting tension are constituted by at least one idler roll, particularly two rolls arranged upstream and downstream of the first and second teeth.

According to a preferred embodiment of the invention, the first and second sets of toothing are each constituted by toothed rolls.

The present invention also relates to a laminate comprising at least one ply of non-woven material, preferably two plies of non-woven material, and at least one elastic film having a width and secured to said at least one ply, particularly being sandwiched between the two plies of non-woven material, particularly through the interposition of a bonding material, particularly glue, whereby the laminate, in cross-section, in said width, has an activated width (in which the elasticity is not essentially zero, that is to say it is greater than that of the laminate alone) which is less than or equal to said width and in which it has been activated, whereby the activated width has a left region and a right region, whereby the elasticity of the laminate, measured in particular through the elongation test at 10 Newton, increases from the left edge of the activated width over at least a section of the left region and decreases over at least a section of the right region towards the right edge of the activated width.

Unlike the laminates of the prior art which have an elasticity in the activated width which is essentially constant or uniform, the laminate according to the invention has a greater elasticity towards the centre than in the edge sections of said width. This gradient (or variation) of the elasticity and in particular the fact that the elasticity is less at the edges means that during use, in particular in training pants, the laminate has less propensity to become unstuck at the outer edges of the interface between the non-woven materials and the elastomer, under the effect of numerous successive stretching actions realised by the user during use and each time he closes the nappy.

According to a preferred embodiment of the invention, the curve reproducing the elasticity as measured by elongation at 10 Newton (in % elongation) as a function of the distance in mm from the measuring point of the left edge of said activated width shows, at each measuring point in the increasing section, or left region, an essentially non-zero gradient which is less than 50%/mm, preferably less than 25%/mm, more preferably less than 20%/mm, for example less than 15%/mm, for example between 50 and 5, for example between 25 and 5, particularly between 15 and 5.

According to a preferred embodiment, the laminate comprises at least two elastic films each having a width, the elasticity curve of the activated width on the right being mirror symmetrical to the elasticity curve of the activated width on the left, and in particular the gradient in absolute value of the elasticity curve in the right section of decrease of the left activated width being less than or equal to that of the left section of increase of the left activated width, and in particular is less than 20, particularly less than 12, more particularly less than 10, even more particularly less than 7.

The elasticity curve preferably has a maximum for a measuring point which is essentially in the middle of said width of the laminate.

BRIEF DESCRIPTION OF THE DRAWINGS

A preferred embodiment of the invention is shown in the drawings, given merely by way of example, and in which:

FIG. 3 is a schematic view of a composite obtained through the method implemented in the devices of FIGS. 1 and 2, having two elastic films;

FIG. 4 is a cross-sectional view of a part of the composite of FIG. 3, in the non-stretched state;

FIG. 5 is a cross-sectional view of the part of the composite of FIG. 4, in the stretched state;

FIG. 6 is a cross-sectional view of a composite similar to that of FIG. 3;

FIG. 7 is a view equivalent to that of FIG. 6 for the composite of FIG. 3;

PREFERRED EMBODIMENT FOR CARRYING OUT THE INVENTION

Figure 1:
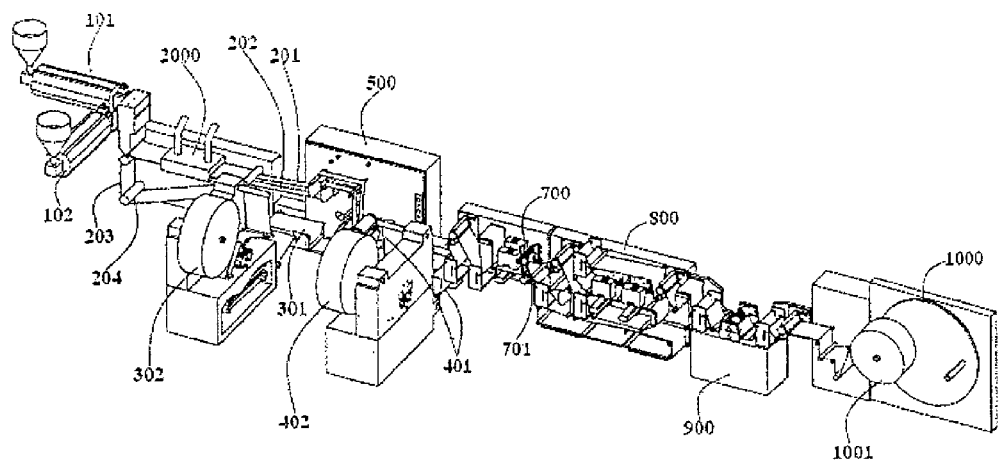
FIG. 1 is a perspective view of a device according to the invention.
Figure 2:
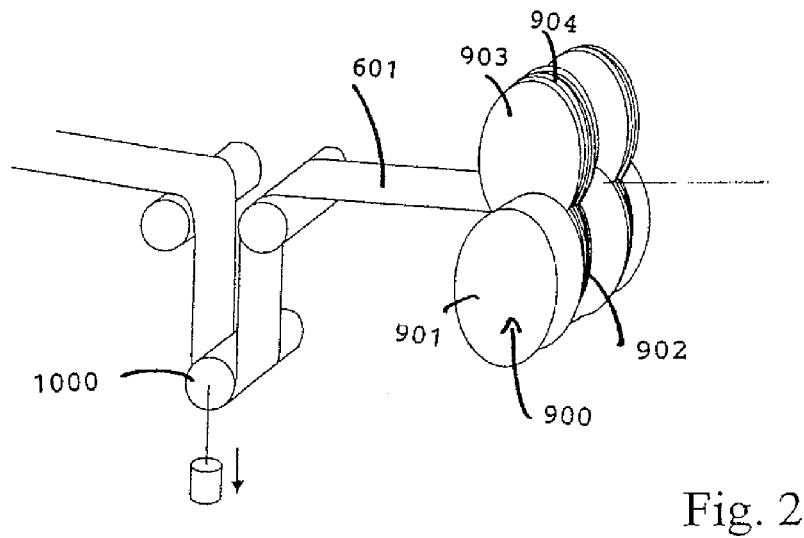
FIG. 2 is a cross-sectional view of a schematised section of the device of FIG. 1.

The device of FIG. 1 comprises two extruders 101, 102 which form, through extrusion, two webs 201, 202 of elastomer film which, after cooling in an intermediate cooling unit 2000, by belt 203 and idler 204 systems regulated in temperature, are transported to two rolls which simultaneously receive two plies of non-woven material 301 and 401 to be secured there with glue 501 between the non-woven materials in a fixing unit 500, whereby the non-woven materials themselves are stuck to each other by the glue 501 in the sections where there is no elastic film. The non-woven material 301 is unrolled from a reel 402. The second non-woven material 401 is unrolled from a reel 402. The composite constituted by the non-woven materials 301 and 401 and the elastic films 201, 202, namely the composite 601, is then cut to the correct width in a width cutting system 700 comprising circular knives 701 which pass into a soldering unit 800 allowing soldering of the longitudinal edges. The non-woven materials are finally activated with a view to breaking them in an activation unit 900. The activation unit 900 comprises a first roll 901 having teeth 902 and a second roll 903 having teeth 904. The teeth of the toothing 901 engage in the teeth of the toothing 904.

A tension-regulating idler roll 1000 is arranged at the entrance to the activation unit 900 and works in cooperation with a motor driving one of the toothed activation rolls in rotation in such a way as to keep the longitudinal tension of the laminate constant during its activation.

The relative speed of unrolling of the roll 1000 in relation to the speed of unrolling of the toothed rolls is such that the composite 601 undergoes a longitudinal tension during its movement and in particular when it is between the toothing.

This longitudinal tension is regulated to at least 1 Newton (N) for 10 mm of width and 100 gm$^2$ of said width of laminate to be activated (that is to say of the laminate solely where there is an interface between an elastomer and at least one ply of non-woven material); preferably, this tension is at least 2 N/10 mm/100 gm$^2$, more preferably at least 2.5, for example between 1.2 and 8, particularly between 2 and 5, for example equal to 2.6.

It is also possible to impart a tension of non-woven material of at least 0.64 Newton (N) for 10 mm of width and 100 gm$^2$ of ply of non-woven material alone; preferably, this tension is at least 0.9 N/10 mm/100 gm$^2$ of non-woven material, more preferably at least 1.2, for example between 0.65 and 3, particularly between 1 and 2, for example equal to 1.3.

The elastic material may or may not have thermo-shrinking characteristics. It can be formed, in particular, from polymers such as copolymers of different types of monomer patterns, for example alternating such as A-B, or in sequence, for example A-A-A-B-B-B, or statistic, for example A-A-B-A-B-B-A-A-A-B-A, of which the whole of the network obtained can have different structures, either linear of the type A-B-A, or radial of the type (A-B)n, index n (n>2), or diblock of the type A-B, which are elastomers, for example the copolymers styrene/isoprene (SI), styrene/isoprene/styrene (SIS), styrene/butadiene/styrene (SBS), styrene-ethylene/butylene-styrene (SEBS), styrene-ethylene/propylene-styrene (SEPS) or SIBS. Mixtures of these elastomers with each other or with non-elastomers modifying certain characteristics other than elasticity may also be considered. For example up to 50% by weight but, preferably, less than 30% by weight of polymer can be added in order to modify certain characteristics of the base materials (elasticity, heat resistance, processability, UV resistance, dye, . . . ), such as styrene polyvinyls, polystyrenes or poly α-methyl-styrene, epoxy polyesters, polyolefines, for example polyethylenes, or certain acetates of ethylene/vinyl, preferably those of high molecular weight.

The elastic material can be, in particular, a styrene-isoprene-styrene, available for example from Kraton Polymers under the name KRATON D (trade mark filed), or DEXCO POLYMERS LP under the name VECTOR SBC 4211 (trade mark filed). A thermo-plastic elastomer of polyurethane can also be used, in particular PELLATHANE (trade mark filed) 2102-75A of The Dow Chemical Company. A styrene-butadiene-styrene can also be used, in particular KRATON D-2122 (trade mark filed) of Kraton Polymers, or VECTOR SBC 4461 (trade mark filed) of Dexco Polymers LP. A styrene-ethylene/butylene can also be used, in particular KRATON G-2832 (trade mark filed) of Kraton Polymers or a sequenced styrene-ethylene-butylene-styrene copolymer (SEBS), in particular KRATON (trade mark filed) G2703. A copolymer of isooctyl acrylate and of acrylic acid can also be used according to the monomer ratios of 90/10. A sequenced polyamide polyether copolymer PEBAX (trade mark filed) 2533 of Arkema can also be used.

Other possible materials are polyolefine polymers, principally copolymers of ethylene and/or propylene, having characteristics of elastomers, in particular originating from metallocenic catalysis such as VISTAMAXX VM-1120 (trade mark filed), available from Exxon Mobil Chemical or also charged polymers EPDM of the Santoprene type.

It is also possible according to the invention to use a glue such as non reactive hot melt glues, for example H2511 of Bostick, or a reactive PU glue, particularly AX75E of Bostick. These glues will preferably have a chemical nature similar to that of the elastomer film described above. For example if one of these glues is analysed with an infrared spectrometer in order to identify the chemical functions, or a liquid chromatograph for separating and quantifying the substances, traces will preferably be found of one or more components or of their derivatives of the substance or substances of the elastomer film.

These glues will preferably have a base of SIS, SBS, SEBS and SEPS, allowing good affinity with film through similar chemical substances.

The layer of glue preferably has a grammage of less than 23 g/m$^2$, more particularly less than 15 g/m$^2$, particularly less than 12 g/m$^2$, more preferably less than 8 g/m$^2$.

With regard to the non-woven materials, it is possible to use polypropylene, polyester and all other materials usual in the field. It is also possible to play on the elongation for the transverse fracture of the non-woven materials to facilitate the activation to the maximum.

FIG. 7 shows a laminate such as obtained on leaving the device of FIG. 1, after passage through the activation toothing. The composite 601 comprises an upper ply of non-woven material 301 and a ply of non-woven material 401, between which two elastic films 201 and 202 of smaller width are sandwiched.

FIG. 3 shows, according to a sectional view, transversely to the machine direction (direction of the X's), that is to say the direction of the Ys in which the laminate of FIG. 7 extends in length. This laminate is constituted by two plies of non-woven material 301 and 401 having a large width, for example a width of 170 mm here. Two elastomer films 201 and 202 of small width, for example of 45 to 55 mm, are sandwiched between the two plies of non-woven material. Two layers of glue 501 secure each non-woven material to one of the faces of the elastomer films and, when there is no elastomer film, to the other non-woven material.

For the elastic films, the layers of glue have the form of strips parallel to each other, at a distance from each other, a distance which may be zero and between for example 0 mm and 2 mm, whereas the layer of glue 501 is continuous between the non-woven materials where there is no elastic film.

After formation of the laminate, the two plies of non-woven material, at the level of at least one elastomer film, are activated through passage between activation rolls, that is to say, these two non-woven materials, in the section covering the at least one elastomer film, are broken in a preferential way in cross direction (or transverse direction) to form sorts of grooves in the transverse direction so that, at the level of the two elastomers, the laminate has an elasticity in the transverse direction corresponding essentially to that of the elastomer films.

In order to realise this breaking, the laminate is passed while holding it in its central section where the grooves are to be formed, through application of an elastic strip which plates the laminate by covering it and the laminate is then stretched and also the elastic strip which is in contact with it, distorting them in order to bring the fibres of the non-woven material of the laminate apart from each other, breaking the non-woven material, the elastic film and the elastic strip during this stretching. Once the distortion is complete the elastic film and the elastic strip return to their non-distorted initial state whereas the non-woven material is broken permanently.

After the coming apart (de-cohesion of the fibres from each other), the fibres of the non-woven materials tend to regroup at the strips of glue in order to form monticules of non-woven materials, whereas between the strips of glue the fibres of non-woven materials, by reason of the breaking, are more rare and are more scattered. There are thus zones (at the strips of glue) where the non-woven material is of greater thickness than in the intermediate zones (where there is no glue), or possibly in the extreme case, there may no longer be any non-woven material. In the non-stretched state of the laminate the zones of greatest thickness come into lateral contact (by their edge parallel to the transverse direction) with each other and, when the laminate is stretched, the zones of greatest thickness are distanced from each other, whereby the intermediate zones thus appear, either without non-woven material or with a smaller thickness of non-woven material.

In FIG. 6 which shows the case of a laminate only having only a single elastic film 203, at least one zone (in particular the entirety) of the central region 30 has an elasticity which is greater than the elasticity of the edge regions 31 and 32, measured in an area of these edge regions, particularly 10% greater, for example 20% greater.

In FIG. 7 at least one zone (particularly the entirety) of the two central regions 30 has an elasticity greater than the elasticity of the edge regions 31 and 32, measured in a zone of these edge regions, particularly 10% greater, for example 20% greater.

In FIG. 5, the strips 501 of glue, spaced apart from each other, and the non-woven material 301 comprise zones 22 of greater thickness (in relation to the thickness of the non-woven material before breaking) and zones 23 of smaller thickness (in relation to the thickness of the non-woven material before breaking) which appear more clearly when the laminate is stretched.

The elastic film has a width 1 perpendicularly to the direction of placing on the ply of non-woven material. It has a surface, on the side of the non-woven material 301, which is planar. In longitudinal section this surface is in the form of a straight line. No fibre of the non-woven material is immersed in the material of the elastic film and all the fibres are on the same side of this straight line, and this is the case regardless of the longitudinal section.

In the case of the laminate of FIG. 6, the elasticity of the left region 31 of the laminate increases from the left edge 33 of said activated width 1 of laminate towards the middle 34 of this said width. The elasticity of the right region 32 decreases from the middle 34 towards the right edge 35. The elasticity can be measured by the elongation test at 10 Newton and is described below.

Figure 8:
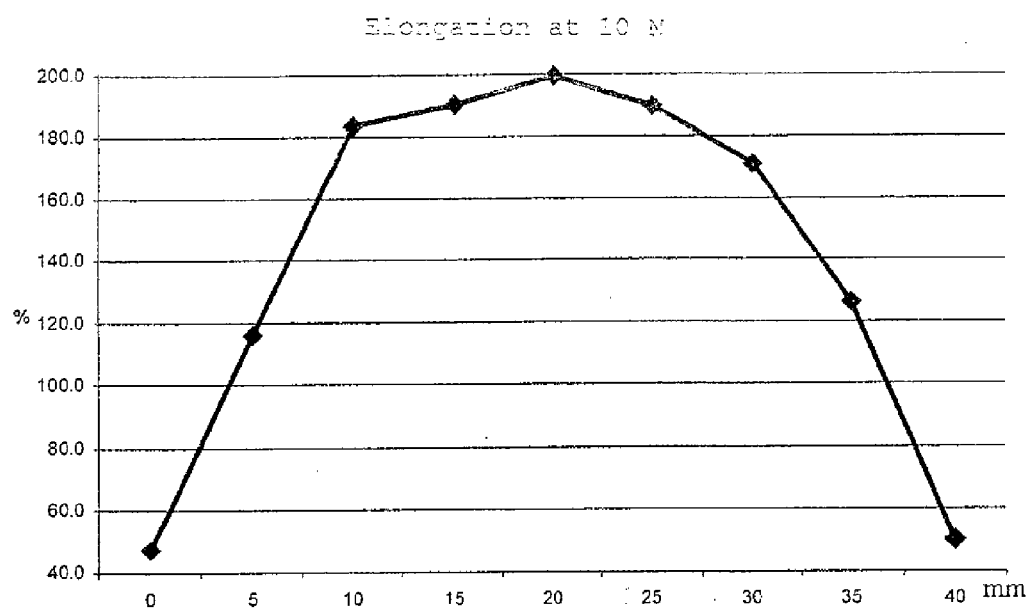
FIG. 8 shows an example of a graph reproducing the curve for elasticity variation along the width direction in a width of a laminate according to the invention, in the case of a laminate of FIG. 6.

As seen in FIG. 8, the elasticity has a lower gradient than 0.21, being essentially symmetrical in relation to the centre of said width.

Figure 9:
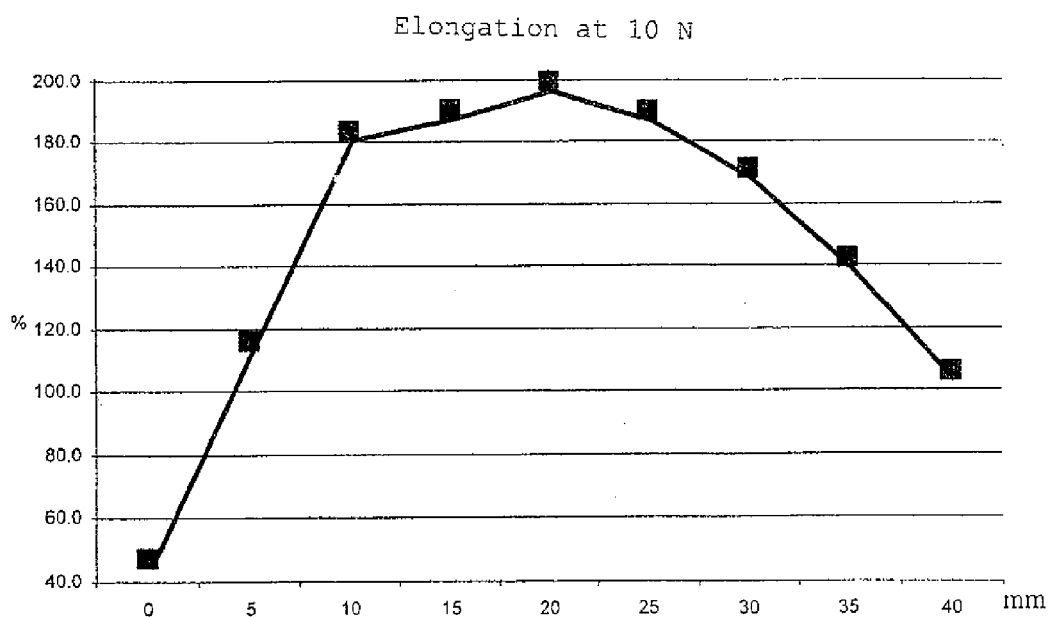
FIG. 9 shows an example of a graph reproducing the curve for elasticity variation along the width direction in a width of a laminate according to the invention, in the case of a laminate of FIG. 7.

In the case of the laminate of FIG. 7, the first activated width 11 of laminate has a left region 40 of which the elasticity increases from the left edge 36 towards the middle 37 and a right region 41 of which the elasticity decreases from the middle 37 towards the right edge 38. As seen in FIG. 9, the gradient (in absolute value) at the left edge is greater than the gradient at the right edge. The gradient at the left edge is less than 0.21 while at the right edge it is less than 0.1.

The second activated width 12 of laminate has a left region 42 of which the elasticity increases from the left edge 39 towards the middle 44 and a right region 43 of which the elasticity decreases from the middle 44 towards the right edge 45. As seen in FIG. 9, the gradient (in absolute value) at the right edge is greater than the gradient at the left edge. The gradient at the left edge is less than 0.21 while at the right edge it is less than 0.1. The elasticity curves in the two activated widths are mirror symmetrical.

The fact that the elasticity is lower at the edges compared to the middle means that the laminate is more resistant to the connection between the non-woven material and elastomer becoming unstuck; in particular it only becomes unstuck at the end of a number of lateral stretching actions (carried out by the user, particularly of training pants, when he closes the training pants by stretching the closing tabs realised on the basis of the laminate of the invention, in order to ensure that the nappy is well adapted elastically to the contour of the baby) much more than is the case of laminates of the prior art, of which the elasticity is essentially uniform. It follows that according to the invention it is possible to omit the provision of solder lines along the longitudinal edges 33, 35, 36, 38, 39, 45 of the laminates, or to provide a glue with lower sticking power. However, quite clearly, it is possible to choose, without going outside of the field of protection of the invention, to always provide such solder lines or glues with great sticking power in order to obtain a laminate which is even more resistant to becoming unstuck.

In order to measure the elasticity and to realise the elasticity curve (FIGS. 8 and 9) by the elongation test at 10 N, a main sample is taken following activation of for example 45 mm activated width and 45 mm long and 9 measuring samples are formed, each centred on the point at which the elasticity is to be measured, each measuring sample being in the form of a strip of for example 5 mm in width and 45 mm in length, which is stretched with the aid of a dynamometer with jaws (particularly that indicated below) from its initial non-stretched length, with a force of 10 N, at an ambient temperature of 23° C. at +/−2°, a relative humidity of 50%, +/−5% and a normal atmospheric pressure. The elongation obtained is thus measured as a percentage. Two or three main samples are preferably taken in order to carry out the measurements several times (at least three times) and the average value is taken for each elasticity value shown in the graphs of FIG. 8 or 9.

At each measuring point the gradient of the elasticity curve at the measuring point (necessarily positive, the horizontal not having a gradient) is calculated as being the ratio of the difference between the elasticity value measured at the measuring point and the elasticity value measured at the preceding measuring point on the width dimension (distance between the two consecutive measuring points) of the measuring sample.

It is thus possible for example to measure the elasticity of a laminate in determining the remanence thereof by the following test:

The sample is conditioned in a normal atmosphere such as defined in the ASTDM 5170 norm, temperature of 23° C.+/−2° C. and relative humidity of 50%+/−5%.

The dynamometer apparatus used is in accordance with the EN 10002 norm, in particular the Synergie 200, 1 column, available from MTS Systems Corp., USA, together with utilisation software TESTWORKS 4.04B.

The sample is prepared by cutting the elastic product (for example the laminate of the invention) with a cutter or scissors into a sample of 45 mm of width in the machine direction (MD) (perpendicularly to the plane of FIG. 1) and a length in the cross direction (CD) (horizontal direction in FIG. 1) of 60 mm.

(Anti-sliding) reinforcements are positioned, for example a ply of non-woven material, in order to avoid the sliding and the start of fracture of the sample between the jaws by fixing them with a double face on each side of the elastic zone to be tested and on each side, as represented schematically in FIG. 3;

The parameters are selected as follows:
Inter-jaw distance: 20 mm
Machine speed: 254 mm/mn
Number of cycles: 2
Elongation of the product: 100% at constant speed.

The product is stretched at 100% by vertical displacement of the upper jaw, the lower jaw being fixed, then it is maintained in the position for 30 seconds, and then the initial position is resumed at constant speed, in which it is left for 60 seconds (end of the first cycle), then it is again stretched at 100%, it is maintained for 30 seconds and then the initial position is resumed (end of second cycle). The curve is thus obtained giving the stretching force as a function of the elongation in %, this exhibiting a hysteresis which allows the set to be determined by the following calculating formula:

$$SET = L1 - L10$$

With:
L0: intersection point with the axis of the X's (elongation in %) at the start of the test, namely the start of the first cycle.
L1: intersection point with the axis of the X's (elongation in %) at the start of the second cycle after the return to the original position and a wait of 60 seconds.

When the laminate has been obtained, it is then subjected to an activation, that is to say the elastic capacities of the elastic film imprisoned between the two non-woven materials which are not elastic are released.

In the case of the present invention the appearance of the non-woven materials after the activation has scarcely been modified, in the same way as the width of the film and its elastic properties. In particular the non-woven materials are softer to touch and irritate the skin of the wearer of the nappy less.

A non-woven material is a textile surface obtained by mechanical and/or chemical and/or thermal bonding of textile fibres arranged in webs, excluding weaving or knitting (cf Lexique des fils et des étoffes, ISBN: 2-9509924-1-1).

Thus, a non-woven material is a cluster of fibres of small dimensions which are associated with each other by mechanical compacting, by mixing with a bonding material or by partial fusion of the non-woven material. When the non-woven material is stretched according to the invention in order to activate it, the small fibres compacted with each other are separated in order to bring them apart from each other. This bringing-apart involves breaking of the non-woven material. The fibres are not necessarily stretched and, moreover and in general, taking their size into account, are not stretched. If they are to be stretched, it is possible to use a so-called "incremental" activation system. However, this system requires a complex installation, with toothed rolls which engage in each other, and according to the invention this can be omitted.

In the present invention the terms film or elastic laminate are understood to be a film or a laminate which have, according to the preceding test, a remanence or SET of less than 15%, preferably less than 10%, more preferably less than 5% for a stretching of 100% of the initial width thereof.

An elastic material is understood to be a material such as a film, constituted solely by this material, which is elastic. Elasticity is the physical property of a body to resume its initial form after suppression of the load on it.

What is claimed is:

1. A laminate having a laminate length in a longitudinal direction (MD) and a laminate width in a transverse direction (CD), said laminate comprising at least one ply of non-woven material and at least one elastic film secured on said at least one ply of non-woven material, said laminate having been activated so as to have an elasticity in at least one activated region having an activated region width in the CD direction extending between a left edge and a right edge, wherein along said activated region width in the CD direction, said elasticity increases along a left section of the activated region width starting from a left point a distance of 2.5 mm from the left edge and decreasing along a right section of the activated region width ending at a right point a distance of 2.5 mm from the right edge.

2. The laminate of claim 1, wherein a curve reproducing the elasticity of the laminate in said at least one activated region along an activated region width in the CD direction, as measured by the elongation at 10 Newton (in % elongation), as a function of a distance in millimeters from the left edge of said at least one activated width presents along said left section a gradient which is less than 50%/mm.

3. The laminate of claim 1, wherein said at least one elastic film comprises a left elastic film and a right elastic film, said laminate having been activated so as to have an elasticity in both a left film activated region having a left film activated region width in the CD direction and in a right film activated region having a right film activated region width in the CD direction, whereby the elasticity curve reproducing the elasticity of the laminate in the right film activated region in the CD direction is mirror symmetrical to the elasticity curve reproducing the elasticity of the laminate in the left film activated region in the CD direction, both elasticity curves having respective left and right sections and the gradient in absolute value of the elasticity curve in the right section of the left film activated width being less than or equal to that in the left section of the left film activated width.

4. The laminate of claim 3, wherein said elasticity curve in the right section of the left activated width has a gradient which is less than 20%/mm.

5. The laminate according to one of the claim 2, characterised in that the elasticity curve has a maximum for a measuring point essentially in the middle of said activated width of the laminate.

6. The laminate of claim 1 wherein said elastic film is secured to said at least one ply by a bonding material.

7. The laminate of claim 6 wherein said bonding material is a glue.

8. The laminate of claim 1 wherein there are two plies on non-woven material, said elastic film being sandwiched between said two plies of non-woven material.

9. The laminate of claim 8 wherein said elastic film is secured to said two plies of non-woven material by a bonding material.

10. The laminate of claim 9 wherein said bonding material is a glue.

11. The laminate of claim 1 wherein the elasticity is measured by the elongation test of 10 Newton.

12. The laminate of claim 8 wherein the elasticity is measured by the elongation test of 10 Newton.

13. The laminate of claim 2 wherein the gradient is less than 25%/mm.

14. The laminate of claim 2 wherein the gradient is less than 20%/mm.

15. The laminate of claim 2 wherein the gradient is less than 15%/mm.

16. The laminate of claim 2 wherein the gradient is in the range of 5% to 50%/mm.

17. The laminate of claim 2 wherein the gradient is in the range of 5% to 25%/mm.

18. The laminate of claim 2 wherein the gradient is in the range of 5% to 15%/mm.

19. The laminate of claim 4, wherein said elasticity curve in the right section of the left film activated width has a gradient which is less than 12%/mm.

20. The laminate of claim 4, wherein said elasticity curve in the right section of the left film activated width has a gradient which is less than 7%/mm.

21. A laminate having a laminate length in a longitudinal direction (MD) and a laminate width in a transverse direction (CD), said laminate comprising a least one ply of non-woven material and at least one elastic film secured on said at least one ply of non-woven material; said laminate having been activated so as to have an elasticity in at least one activated region having an activated region width in the CD direction extending between a left edge and a right edge; said elastic film having a constant thickness along said activated region width; wherein along said activated region width starting in the CD direction said elasticity increases along a left section of the activated region width starting from a left point a distance of 2.5 mm from the left edge and decreases along a right section of the activated region width ending at a right point a distance of 2.5 mm from the right edge.

\* \* \* \* \*